United States Patent

Ohkoshi

[15] 3,688,045

[45] Aug. 29, 1972

[54] METHOD FOR PHOTOGRAPHING AND REPRODUCING THREE-DIMENSIONAL IMAGES

[72] Inventor: Takanori Ohkoshi, No. 7-7, 3-chome, Sengoku, Bunkyo-ku, Tokyo, Japan

[22] Filed: March 4, 1970

[21] Appl. No.: 16,430

[30] Foreign Application Priority Data

March 10, 1969 Japan ......................44/17845

[52] U.S. Cl. ...................178/6.5, 95/12.21, 95/18 P, 350/131, 350/138, 350/167

[51] Int. Cl. ...............................................H04n 9/54

[58] Field of Search....178/6.5; 95/12.21, 18 R, 18 P; 355/22, 52; 350/131, 138, 130, 167, 190

[56] References Cited

UNITED STATES PATENTS

| | | | |
|---|---|---|---|
| 3,046,330 | 7/1962 | Ross | 178/6.5 |
| 2,174,003 | 9/1939 | Ives | 95/18 |
| 2,756,363 | 7/1956 | Wright | 178/6.5 X |
| 3,322,486 | 5/1967 | Vetter | 350/190 X |

OTHER PUBLICATIONS

IBM Technical Disclosure Bulletin Vol. 10 No 5 Oct. 1967 598- 600

*Primary Examiner*—Robert L. Griffin
*Assistant Examiner*—Richard K. Eckert, Jr.
*Attorney*—McGlew and Toren

[57] ABSTRACT

A method of photographing and reproducing three-dimensional images which is characterized by photographing, developing or transmitting two or more images of the object as viewed from different directions with such magnifying powers as being different in vertical direction and lateral direction, using a lens system having such focal distances as being different in vertical direction and lateral direction.

13 Claims, 8 Drawing Figures

INVENTOR
BY TAKANORI OHKOSHI
McGlew & Toren
ATTORNEYS

INVENTOR
TAKANORI OHKOSHI
BY McGlew & Toren
ATTORNEYS

METHOD FOR PHOTOGRAPHING AND REPRODUCING THREE-DIMENSIONAL IMAGES

As the quality of the information exchanged in the human society is enhanced, the necessity for recording and producing three-dimensional images is increasing. The present invention relates to a comparatively easy method of recording and reproducing three-dimensional images of good quality. Explanation shall be made first on the publicly known simple type of reproducing apparatus for three-dimensional images, next on the process of image reproduction in the present invention as an improvement of the first method, then about the method of photographing and image reproduction process for television according to the present invention.

The present invention shall be described referring to the attached drawings in which.

Figure 1:
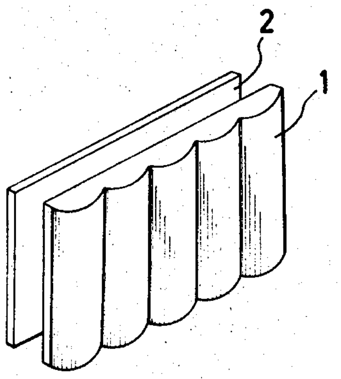
FIG. 1 and FIG. 2 show a lenticular sheet backed by a diffusing surface which is typical as conventional type of reflective plane having selectivity for direction of reflection.
Figure 2:
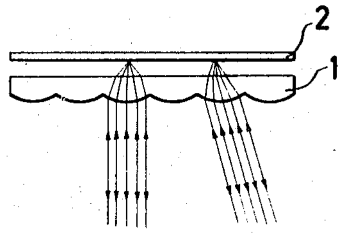
Figure 3:
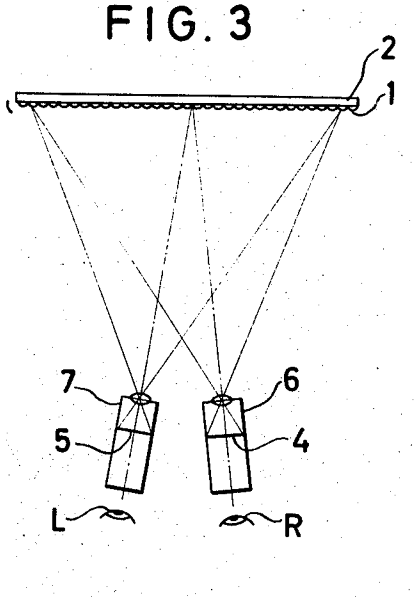
FIG. 3 shows apparatus for reproducing a simplest three-dimensional image utilizing said lenticular sheet.

One of the methods for recording and reproducing three-dimensional images is to employ a reflective plane having a selective direction of reflection, or the so-called "auto-collimating screen." An example of such a screen shown in FIG. 1 consists of the so-called lenticular sheet 1 which is made of a number of fine lenses of semi-cylindrical shape being arranged in vertical direction, and a white light-diffusing plane 2 placed at the focusing plane of the lenticular sheet, which has such characteristics that the incident light flux is reflected almost to the direction of the incident light as shown in FIG. 2. On the other hand as a lenticular sheet does not have any lens property in the vertical direction, it will simply diffuse the incident light flux in the vertical direction to a wide angle. Therefore, when two picture plates, 4, 5 which have been photographed by a so-called stereo-camera are projected on such a reflective plane 3 having a selectivity for direction of reflection as mentioned above, by using two projecting apparatuses 6, 7, and if the observer's right eye, R, and left eye, L, are placed just above the two projecting apparatuses as shown in FIG. 3, then a three-dimensional image will be observed.

Figure 4:
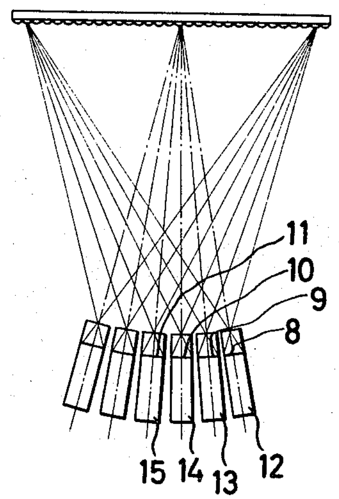
FIG. 4 shows a method for improving the quality of the three-dimensional image obtained by the apparatus of FIG. 3.

However, the above-method requires the observer to place his eyes at almost fixed positions. To overcome such a difficulty, this method is conceived that a number of picture plates 8, 9, 10, 11 ..... photographed from different angles with small separations can be projected also from a number of projecting apparatuses 12, 13, 14, 15 ..... as shown in FIG. 4. For example, when 20 projecting apparata are arranged with a lens-to-lens separation of 1cm for a total width of 20 cm, such a three-dimensional image is almost continuous and will be seen without inconvenience, even when the observer moves his eye-positions to left or right.

The present invention relates to a method of improving the quality of the image obtainable with the above method.

Now, suppose the number of the projecting apparata is further increased for obtaining natural three-dimensional feeling and the spacing between lenses is reduced to, for example, 5 mm. When the shape of the screen is square, the size of the picture plates will be 5 mm square and it will be necessary to pass a considerable amount of light strand through such a small area. This necessarily brings about the heating-up of the film plates and a temperature rise, and this temperature rise constitutes a big shortcoming in practice.

Figure 5:
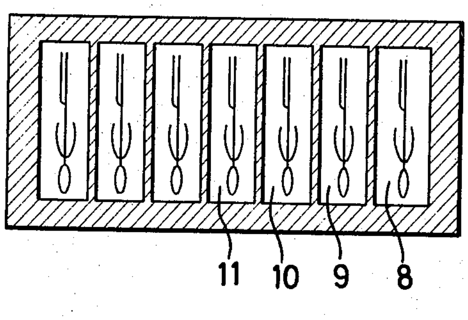
FIG. 5 and FIG. 6 are schematic drawings of an image reproducing apparatus based on the principle of the present invention.

The present invention relates to a modification in which the picture plates are made in a shape of vertically long strips as shown in FIG. 5 for allowing an increased light strand passing through them for reproducing images, as a means for solving the above-mentioned shortcomings. Here the images 8, 9, 10, 11 ..... are obtained by photographing same object from slightly different angles.

Figures 6, 7, 8:
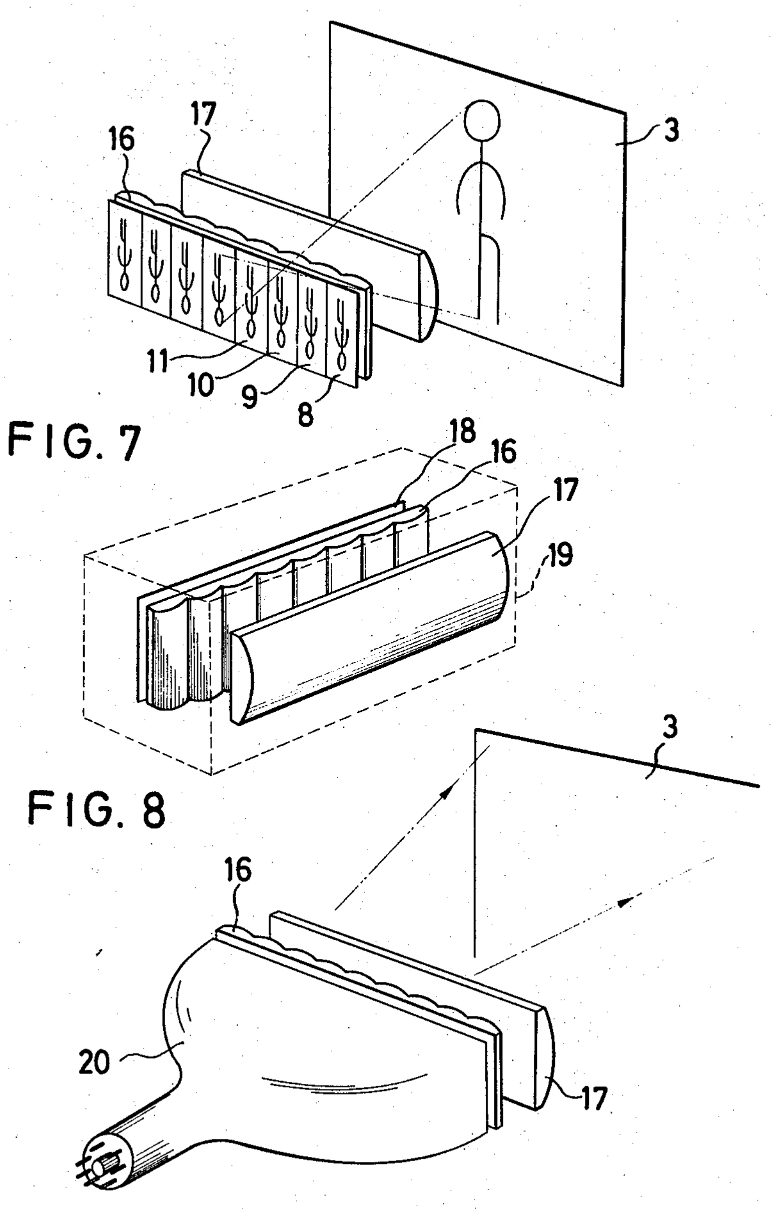
FIG. 7 and FIG. 8 are drawings showing an example of a photographing apparatus and an image reproducing apparatus for television according to the principle of the present invention.

If, for the sake of simplicity, the screen on which the images are to be projected is of a square shape, in order to project images on it from the picture plates having vertically long shape, it is necessary to provide a lens system having a smaller magnifying power in the vertical direction as compared with the magnifying power in the transverse direction. Thus, it will be necessary to use such a special lens system as having different focal distances in the vertical direction and in the transverse direction. One example of such a lens system is, as shown in FIG. 6. It is composed of a combination of a row of 16 semi-cylindrical lenses for providing shorter focal distance in the transverse direction and semi-cylindrical lens 17 for providing longer focal distance in the vertical direction.

Although the above explanation has been made, for convenience, on a three-dimensional image reproducing system employing an auto-collimating reflection-type screen, the desired effect may be obtained in almost same manner by using an auto-collimating transmission-type screen.

Also, though the above explanation has been made on the method of reproducing three-dimensional images, such a lens system based on exactly the same principle as above may be used in a camera for photographing and recording the original picture plates which is to be used in the above-mentioned projecting apparatus. One example of such camera for three-dimensional photographing as mentioned above is shown in FIG. 7. In this figure, 16 shows the above-mentioned special lenses, 18 shows photographic film or a plate, and 19 shows the body of camera.

At the same time the present invention can be applied not only to a still image as has been explained above but also to such moving images as three-dimensional movie or three-dimensional television, thus having wide field of applications.

In the case, of television, an original picture size of 5 mm square mentioned before as an example, will apparently be too small, because the amount of light supplied by the fluorescent screen of a cathode-ray tube is much less than the light amount supplied by a projector. Hence the effect of the present invention will be emphasized in this case. One example of the projection-type reproduction apparatus for television based upon the present invention is shown in FIG. 8. In this drawing 20 shows the cathode ray tube.

As has been explained, by using the present invention three-dimensional images having an excellent directional resolving power as well as an enough brightness can be obtained. This invention is also useful in future three-dimensional television technology.

What is claimed is:

1. A method for photographic and reproducing three-dimensional images, which comprises photographing a plurality of images of an object from different directions and with magnifying powers different in the vertical direction from the lateral direction by using a plurality of lens systems each having a focal distance different in the vertical direction and lateral direction, developing the images, and projecting the plurality of images of the object obtained upon substantially the entire area of a direction selective screen for reproducing a three-dimensional image using a plurality of lens systems each having essentially the same structure as that used for photographing the images.

2. The method as in claim 1, wherein photographing and projecting of the images is accomplished with a plurality of lens systems having cylindrical lenses vertically arranged and a cylindrical lens horizontally arranged in optical alignment with the vertically arranged cylindrical lenses.

3. A method as in claim 1, wherein the lens systems are assembled on the screen of a picture tube during the photographing step and the lens systems are assembled with a fluorescent surface of a cathode ray tube of a three-dimensional television during the reproducing step.

4. An apparatus for producing images capable of being viewed three-dimensionally, comprising sensory means having a sensing portion for sensing the images, a plurality of first lens means located to direct light to the sensing portion of said sensory means and each having a larger focal length in one direction transverse to the light being directed than in a second direction tansverse to the light and to the one direction, said first lens means being mutually adjacent to each other, second lens means in the path of light passing through the plurality of first lens means and having a larger focal length in the second direction than the first direction for varying the images produced by said first lens means, said first lens means being positioned between said second lens means and said sensing means.

5. An apparatus as in claim 4, wherein said first lens means have larger focal lengths in the vertical direction than the horizontal direction and said second lens means has a larger focal length in the horizontal direction than the vertical direction.

6. An apparatus as in claim 4, wherein said first lens means each include a cylindrical component having in an axis along the one direction and said second lens means has a cylindrical component along the second direction.

7. An apparatus as in claim 4, wherein said first lens means each produce separate images for light coming from different directions.

8. An apparatus as in claim 4, wherein said sensory means includes a photographic film and wherein housing means hold said lens means and said sensory means relative to each other.

9. An apparatus as in claim 4, wherein said sensing means includes a television picture-taking tube having a front face, and wherein said first lens means and said second lens means are mounted in front of said front face.

10. An apparatus for viewing images three-dimensionally, comprising image forming means for forming a plurality of adjacent images indicative of information seen from different directions, a plurality of first lens means located in the path of light from said image forming means and each having a larger focal length in one direction transverse to the path of light than a second direction tansverse to the path of light and to the one direction, second lens means in the path of the light passing through the plurality of first means and having a longer focal length in the second direction than in the first direction for varying the images passed by said first lens means, said first lens means being positioned between said second lens means and said image forming means.

11. An apparatus as in claim 10, further comprising a direction selective screen, and wherein each of said first lens means projects one of said images over substantially the entire screen.

12. An apparatus as in claim 10, wherein said first lens means each have a cylindrical component in the one direction and said second lens means have a cylindrical component in the second direction.

13. An apparatus as in claim 10, wherein said image forming means includes a cathode ray tube producing a plurality of images and having a front face, and wherein the first lens means and said second lens means are mounted on the front face.

* * * * *